Dec. 18, 1928.
R. K. WINNING
1,695,938
CONTROL MECHANISM
Filed June 1, 1925
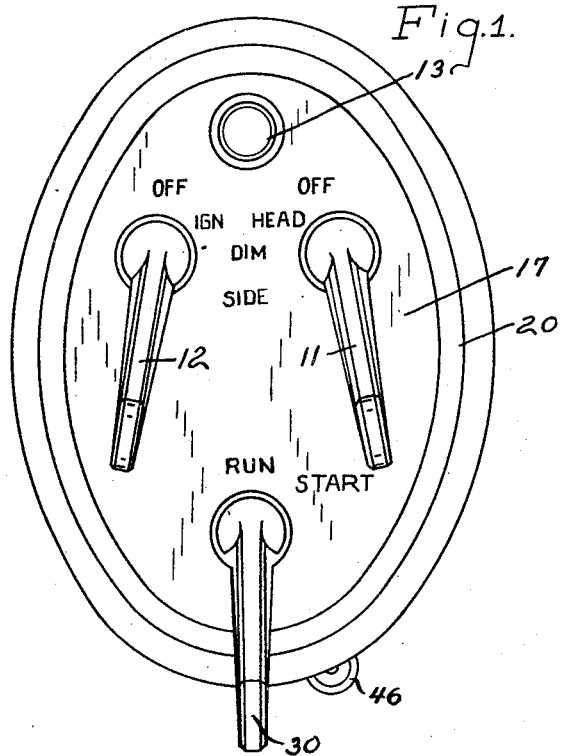
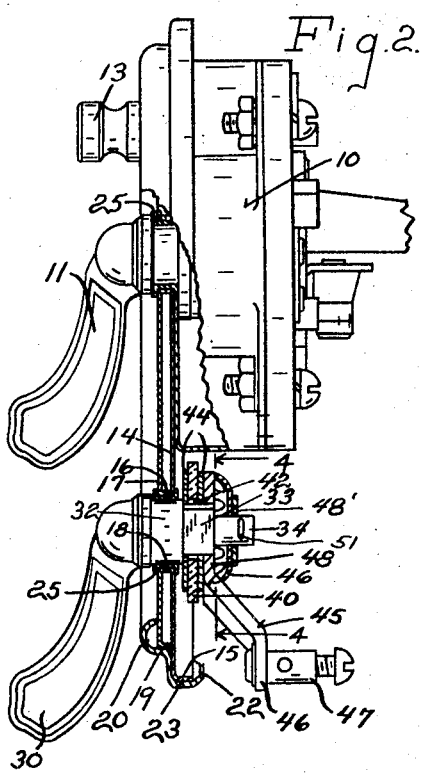
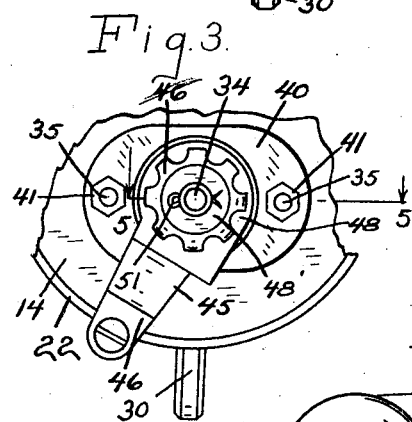
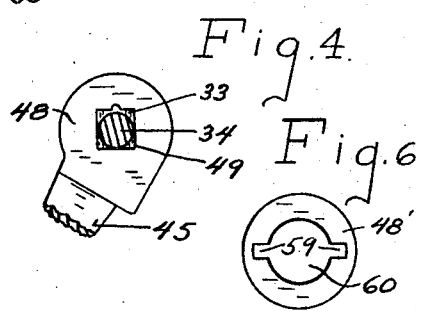
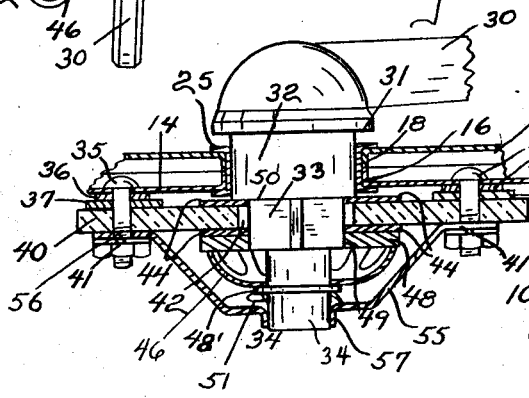
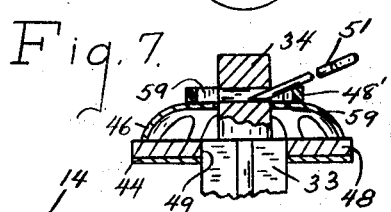
INVENTOR.
Robert K. Winning
BY
Erwin, Wheeler & Woodard
ATTORNEYS.

Patented Dec. 18, 1928.

1,695,938

UNITED STATES PATENT OFFICE.

ROBERT K. WINNING, OF WAUWATOSA, WISCONSIN, ASSIGNOR TO CLUM MANUFACTURING CO., OF MILWAUKEE, WISCONSIN.

CONTROL MECHANISM.

Application filed June 1, 1925. Serial No. 34,064.

This invention relates to improvements in control mechanism such as is particularly adapted for use on the dash board of a motor vehicle for adjusting connections to a carburetor, timer, or other engine part.

It is the object of the invention to provide a novel and improved control mechanism assembly such as may conveniently be organized with a switch plate, and which is manually adjustable and self retaining in any given position of adjustment. More particularly stated, it is one of the objects of the invention to provide a novel means for the frictional retention of a manually adjustable part, and it is a further object of the invention to provide a novel organization or mounting for the manually adjustable part and the frictionally operable retaining means.

In the drawings:

Figure 1 is a front elevation of a switch plate upon which is mounted a switch plate incorporating a device embodying this invention.

Figure 2 is a side elevation of the structure shown in Figure 1, a portion of the plate being broken away to expose the interior construction of the parts.

Figure 3 is a detail view in rear elevation of the parts assembled on the lower portion of the switch plate.

Figure 4 is a section taken on line 4—4 of Figure 2.

Figure 5 is an enlarged detail in section taken on the line indicated at 5—5 in Figure 3.

Figure 6 is a plane view of a washer which is preferably used as a spring seat.

Figure 7 is an enlarged detail in axial section showing how the construction of the washer facilitates the manipulation of a cotter pin into position on the shaft.

Like parts are identified by the same reference characters throughout the several views.

The switch casing 10 and the switch mechanism housed therein, adapted to be actuated by levers 11, 12, and knob 13, may embody any desired construction since it forms no part of the present invention. The casing 10 is secured by welding or otherwise to a mounting plate 14 having an inwardly turned flange 15 about its outer peripheral margin, as is shown in Figure 2. At a plurality of points the mounting plate is apertured and is provided about each such aperture with an annular axially extending flange 16 which is best shown in Figure 5. In practice several parts are attached to this mounting plate, and in order that the exterior of the finished device may present a neat appearance a finishing plate 17 is associated with the mounting plate in spaced relation thereto. The plate 17 has apertures corresponding to those in the mounting plate and sourrounding such apertures has annular flanges 18 corresponding to the flanges 16 already described. The periphery of the finishing plate has a rearwardly directed flange 19 abutting the mounting plate and equal in length to the combined length of the annular flanges 16 and 18, whereby to preserve the spacing between the mounting and finishing plates. A bezel 20 of the cross section clearly indicated in Figure 2 extends around the peripheries of the assembled plates and is upset at 22 about the flange 23 on the mounting plate to bind the bezel in position and to retain the marginal portions of the several plates in close association.

In order to retain the intermediate portions of the mounting and finishing plates in intimate contact where the flanges 16 and 18 are used, and in order furthermore to provide a suitable bearing for the actuating connections which pass through the apertures in such plates, I employ an eyelet 25 which is inserted into such apertures and is subsequently upset or riveted in the manner best shown in Figure 5. In this manner the apertures in the mounting and finishing plates are not only maintained in absolute alignment, but the flanges 16 and 18 are also maintained in contact, while the interior of the eyelet 25 provides a suitable bearing for the actuating connections which, in the case of the switch levers and of the control hereinafter to be described, are revoluble therein. The plate assembly just described is preferably made elliptical in shape in order to extend below the cylindrical casing 10 and to provide space upon which a suitable carburetor or other control mechanism may be mounted. Such control mechanism includes a lever 30 disposed exteriorly of the mounting plate and provided with an annular shoulder at 31 of such a size as substantially to conceal the radial flange of eyelet 25. Integral with the handle 30 beyond shoulder 31 is a shaft section 32 journaled in the eyelet 25 and reduced at 33 to square cross section, as best appears in Figure 4. The extremity of the shaft or post connected with handle 30 is again reduced in diameter and is made cylindrical at 34.

Bolts 35 pass through the mounting plate and through the collars or washers 36 and 37 and are utilized to support a friction member 40 in spaced relation to the mounting plate. The friction member 40 may be made of any desired material but is preferably made of some dielectric substance which has a high co-efficient of friction, such as fiber or the like. The nuts 41 on bolts 35 hold the fiber friction member rigidly in contact with the spacing washers 36 and 37. An aperture 42 in the fiber sheet is of sufficient size to receive the squared portion 33 of the shaft connected with hand lever 30 and to permit such shaft to turn freely therein.

The squared shaft section 33 carries upon either side of the friction plate 40 a washer 44 of steel or the like which has a square aperture fitting shaft section 33, whereby to spline the washer for rotation with the shaft while leaving the washer free for axial movement upon the shaft.

The rocker arm 45 has an offset portion 46 carrying a post 47 to which actuating connections leading to any desired engine control may be made fast. The arm 45 has a head 48 provided with a square aperture at 49 fitted to the squared shaft section 33 so that the rocker arm is required to partake of the movements of the hand lever 30. The arm, however, is free for limited axial movement along the shaft.

A dished annular spring 46 has an aperture to receive the cylindrical shaft section 34 and is maintained under compression by a washer 48' and a cotter pin 51 passing laterally through shaft section 34. The compression of the spring is transmitted in the first instance to the head 48 of the actuated rocker arm 45 and thence to the innermost of the metal washers 44 which is thus forced into frictional bearing contact with the fiber friction plate 40. The reaction of the spring 46, transmitted through washer 48' and pin 51 to the shaft, acts through shoulder 50 on the shaft and through the other metal washer 44 to impel this toward the outer washer into contact with that surface of friction plate 40 which is nearest the mounting plate 14.

As a result of this construction it will be observed that the axial position of the shaft is yieldably defined with reference to the friction plate 40. The shoulder 31 on the shaft near the hand lever 30 does not contact with the eyelet 25 but takes its position wholly through the contact of washers 44 with the friction plate. This arrangement greatly facilitates the assembly of the device since it will be obvious that slight variations in thickness of the mounting and finishing plate assembly are immaterial, and the shaft is accurately positioned without reference to such assembly and without requiring any expensive finishing operations, such as would otherwise be necessary in order accurately to limit the shaft movement with reference to the finishing plate.

It will be remembered that the metal washers 44 are splined to shaft section 33 and consequently are compelled to oscillate with hand lever 30. The friction plate 40 with which the washers 44 are in contact is held stationary, and consequently, there will at all times be a considerable frictional resistance to the movement of handle 30. The degree of such resistance will, of course, be proportionate to the pressure of spring 46 and to the character of the materials from which washers 44 and friction plate 40 are made. I have found that actuating connections for controlling any ordinary engine function may be suitably positioned subsequent to a manual adjustment if the plate 40 is made of fiber and washers 44 are made of steel, a spring of moderate compression being used at 46.

If the relatively short bearing provided in eyelet 25 proves inadequate for the support of shaft section 32, an additional bearing may conveniently be provided through the application of a bridge piece 55 which is apertured at 56 to receive the ends of bolts 35 and is provided with an expressed integrally formed cylindrical portion 57 comprising a bearing for the outer end 34 of the handle shaft.

In Figure 6 I have illustrated a special form of washer at 48'. I have found that in assembling this device the operators have a tendency to subject the spring 46 to excessive compression and thereby weakening the spring. This spring is not intended or adapted to have a wide range of movement, but in order to introduce cotter pin 51 through the apertured end 34 of the handle shaft, operators over compress the spring in order to provide plenty of room for the manual manipulation of the cotter pin.

In order to remedy this situation I have provided washer 48' with a pair of diametrically opposite notches 59 opening radially into its central aperture 60. The cotter pin 51 is ordinarily pointed as shown at Figure 7 to the first of the notches 59 and serves to permit the introduction of the point of the cotter pin into the transverse bore through shaft section 34. As the cotter pin is forced through aforesaid bore, spring 46 is subjected only to the minimum amount of compression which is required to accommodate the parts and the beveled point on the cotter pin finds clearance in the other notch 59 to engage the body of the washer beyond said notch and to wedge downwardly that portion of the washer which is so engaged. Obviously this downward movement will only be sufficient to permit of the assembly of the parts and, in practice, notching of the inner periphery of the washer 48′ is found to overcome to a large extent all tendency for the over compression of springs 46.

I claim:

1. The combination with a face plate assembly provided with an aperture, of a shaft extending through said aperture and provided with a hand lever exteriorly thereof, a friction plate spaced interiorly of said assembly and having an aperture for said shaft, washers splined to said shaft and in frictional engagement with said friction plate, a spring confined between a portion of said shaft and one of said washers and acting thereon in a direction to force said washer toward said friction plate, and means upon said shaft adapted to transmit to the other of said washers the reaction of said spring, whereby said shaft is axially positioned with reference to said friction plate irrespective of said mounting plate assembly.

2. In a device of the character described, the combination of a mounting plate and a finishing plate correspondingly apertured and provided with complementary axially extending annular flanges surrounding their respective apertures and in end abutment, and an eyelet extending through said apertures and securing said plates.

ROBERT K. WINNING.